United States Patent
Tran (10) Patent No.: US 7,206,786 B2
(45) Date of Patent: Apr. 17, 2007

(54) METHOD AND SYSTEM FOR ADAPTING MEMORY-RESIDENT DATABASE IN FLEXIBLE SERVICE LOGIC EXECUTION ENVIRONMENT

(75) Inventor: Anh Q. Tran, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 520 days.

(21) Appl. No.: 10/698,413

(22) Filed: Nov. 3, 2003

(65) Prior Publication Data

US 2005/0097116 A1    May 5, 2005

(51) Int. Cl.
*G06F 17/00* (2006.01)
(52) U.S. Cl. .................. 707/101; 707/102; 707/200
(58) Field of Classification Search ............... 707/101
See application file for complete search history.

(56) References Cited

U.S. PATENT DOCUMENTS

| | | | |
|---|---|---|---|
| 5,745,904 A * | 4/1998 | King et al. ............... 707/200 |
| 6,304,867 B1 * | 10/2001 | Schmidt .................... 707/2 |
| 6,496,831 B1 * | 12/2002 | Baulier et al. ............. 707/101 |
| 6,731,625 B1 * | 5/2004 | Eastep et al. .............. 370/352 |
| 6,804,711 B1 * | 10/2004 | Dugan et al. .............. 709/223 |
| 6,941,432 B2 * | 9/2005 | Ronstrom ................. 711/165 |
| 7,051,041 B1 * | 5/2006 | Miller ...................... 707/102 |
| 2004/0136517 A1 * | 7/2004 | Bjornberg et al. ...... 379/220.01 |
| 2005/0021484 A1 * | 1/2005 | Bodin et al. ............... 706/21 |

* cited by examiner

*Primary Examiner*—Don Wong
*Assistant Examiner*—Binh Van Ho (57) ABSTRACT

A method and corresponding system for adapting memory-resident database in flexible service logic execution environment (FSLEE) provides certain features to be incorporated with FSLEE. FSLEE is a framework that supports services, such as processing logic services and telephony services. The method implements FSLEE support for memory based database environments (MBEs), and stores data in a resident memory for the services to improve database access speed.

23 Claims, 8 Drawing Sheets

METHOD AND SYSTEM FOR ADAPTING MEMORY-RESIDENT DATABASE IN FLEXIBLE SERVICE LOGIC EXECUTION ENVIRONMENT

TECHNICAL FIELD

The technical field relates to computer systems, and, in particular, to flexible service logic execution environment (FSLEE) memory-resident database adaptation.

BACKGROUND

FSLEE is a framework that supports services, such as telephony services. An example of the telephony services is a prepaid calling card service. An end user dials an eight-hundred number and enters a calling card number. The calling card number is then validated. A call is connected if the card number is valid or disconnected if the validation fails. Currently, FSLEE employs Enscribe database record manager, which keeps database files on disk. FSLEE may also employ local record caching (LRC) to keep frequently read records in memory so that the records can be accessed more efficiently. However, since FSLEE currently operates in an Enscribe environment, most database files, including the less frequently used records, reside on disks with slower access.

Memory based database environments (MBEs) store data in a resident memory and provides faster database access. However, the current FSLEE framework is not compatible to take advantage of MBEs.

SUMMARY

The embodiments described herein overcome the disadvantages described above.

A method for adapting memory-resident database in flexible service logic execution environment (FSLEE) includes constructing a service table in an FSLEE application, providing a memory based database environment (MBE) indicator to the service table, setting the MBE indicator of the service table in a database configuration file, and providing service independent building blocks (SIBs) to access the MBE table constructed in the FSLEE application.

A corresponding apparatus for adapting memory-resident database in flexible service logic execution environment (FSLEE) includes a memory based database environment (MBE) database that includes a database configuration file. The database configuration file provides an MBE indicator to a service table to differentiate an MBE service table from another service table. The MBE service table is constructed in an FSLEE application. The apparatus further includes an FSLEE application that includes a service independent building block (SIB) library containing a set of SIBs that access the MBE service table constructed in the FSLEE application.

A computer readable medium providing instruction adapting memory-resident database in flexible service logic execution environment (FSLEE). The instructions include constructing a service table in an FSLEE application, providing a memory based database environment (MBE) indicator to the service table, setting the MBE indicator of the service table in a database configuration file, and providing service independent building blocks (SIBs) to access the MBE table constructed in the FSLEE application.

DESCRIPTION OF THE DRAWINGS

The detailed description will refer to the following drawings, wherein like numerals refer to like elements, and wherein.

DETAILED DESCRIPTION

A method and corresponding system for adapting memory-resident database in flexible service logic execution environment (FSLEE) provides certain features to be incorporated with FSLEE. As stated above, FSLEE is a framework that supports services, such as telephony services. An example of the telephony services may be a prepaid calling card service. The method implements FSLEE support for memory based database environments (MBEs), and stores data in a resident memory for the services to improve database access speed. In a memory based database environment, data is stored in a memory instead of on a disk.

Figure 1A:
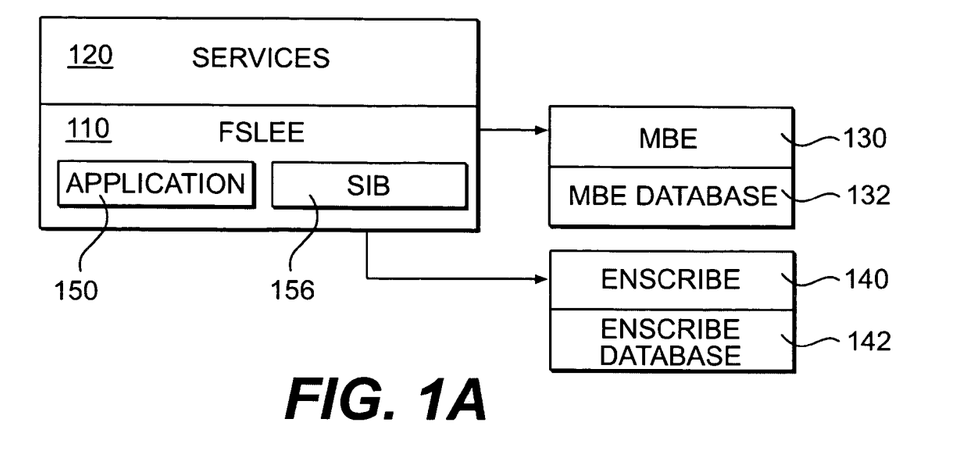
FIG. 1A is a block diagram illustrating an embodiment of an exemplary system for adapting memory-resident database in FSLEE.

FIG. 1A is a block diagram illustrating an embodiment of an exemplary system for adapting memory-resident database in FSLEE. FSLEE 110 provides support for services 120, such as processing logic services. A processing logic service describes the logic for a given FSLEE application 150. An FSLEE application 150 is a program that executes a logic service, which includes telephony services, such as a prepaid calling card service. Referring to FIG. 1A, an FSLEE application 150 supports the services 120 by reading messages from a network and executing the logic defined by the services 120. FSLEE 110 also provides a set of service independent building blocks (SIBs) 156 to implement the logic of the services 120. For example, SIB 156 may perform arithmetic functionalities in a logic service. SIBs 156 may be used by service designers to develop new services. SIBs 156 may allow the services 120 to read and write data to and from a database. A complete service graph includes a Start point, any number of SIBs and one or more End point(s). The Start point, the SIBs and the End point(s) form complete path(s) in a service graph. Each SIB has Inputs, Outputs and Logical Events. The Start point is connected to the first SIB in the service graph. The Logical events from a SIB lead to the next SIBs, whose inputs may be the outputs from the previous SIB. This process is repeated as necessary with different SIBs, each of which provides a specific function, until an End point is reached. The SIBs 156 may also communicate with another network element and perform other standard functions. Other SIBs 156 may be obtained to perform call processing functions needed by a specific protocol that a particular service 120 supports. Examples of these protocols are customized applications for mobile network enhanced logic (CAMEL) and intelligent network application part (INAP).

FSLEE 110 may operate both in an MBE environment 130 and an Enscribe environment 140. MBE environment 130 is an Enscribe compatible facility for managing application databases by providing software executables and application programming interface (API) library routines that allow an FSLEE application 150 to read, insert, update, and delete memory-resident database records. Enscribe environment 140, which is a proprietary database environment, generally stores data on a disk. MBE environment 130 may take data stored on a disk and store the data in a resident memory. A memory-resident database, such as an MBE database 132, permits faster access time than a disk-resident database, such as an Enscribe database 142.

An MBE database 132 operates in an MBE environment 130 and may include records that are maintained in the system memory, which is part of the MBE database 132 shown in FIG. 1A. Alternatively, an MBE database 132 may be based on a disk-resident key-sequenced Enscribe database 142. Each record in a database file has a key, which is used to uniquely identify the record in the database file. The records in the database file are ordered in a sequence according to the value of the keys. An MBE database 132 may be partitioned across one or more central processing units (CPUs) for faster access times. For example, referring to FIG. 1A, the application 150, the SIB 156, and the MBE database 132 may reside on multiple CPUs. The MBE environment 130 can be configured to update a local MBE database 132 and a remote MBE database 132. A remote MBE database 132 is a database that reside on another CPU on the same computer or on another computer connected to the local computer. If the MBE configuration links the MBE database 132 to an Enscribe database 142, MBE environment 130 can be configured to read the records from the Enscribe database 142 into the system memory 132 during MBE initialization.

Figure 1B:
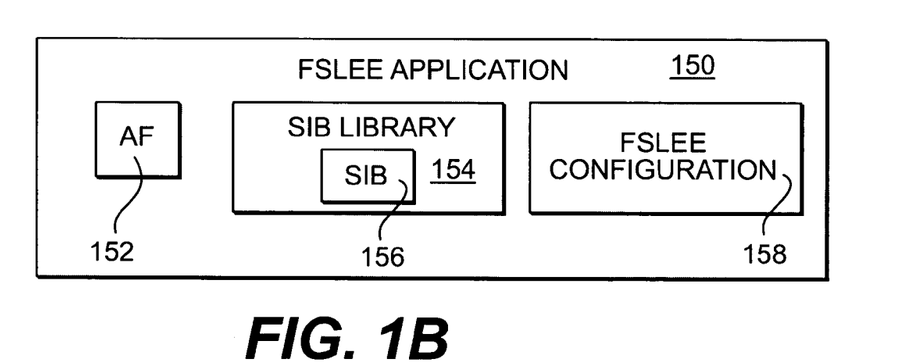
FIG. 1B is a block diagram illustrating an embodiment of an exemplary FSLEE application as illustrated in FIG. 1A.

FIG. 1B is a block diagram illustrating an embodiment of an exemplary FSLEE application 150. The FSLEE application 150 includes an application framework (AF) 152, a SIB library 154 that contains a set of SIBs 156, and FSLEE configuration 158 that renders each FSLEE application 150 unique. The AF 152 is responsible for managing all functionalities of an FSLEE application 150. The AF 152 may manage protocol messages, decode or encode the messages as needed. A service image, a binary representation of a logic service, may be retrieved from a service image database based on a request in a protocol message. The service image database is part of the Enscribe database 142 shown in FIG. 1A. The service image is the coded decision graph that defines the logic for the service 120. A coded decision graph is a visual representation of a logic service. The AF 152 may invoke the service image to execute the SIBs 156 and perform the logic of the service 120.

Figure 2:
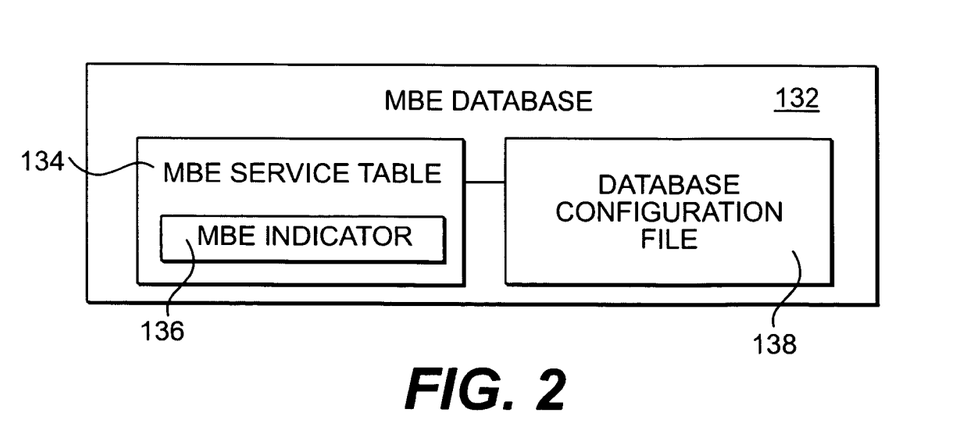
FIG. 2 is a block diagram illustrating an embodiment of an exemplary MBE database as illustrated in FIG. 1A.

FIG. 2 is a block diagram illustrating an embodiment of an exemplary MBE database 132. Referring to FIG. 2, a database configuration file 138 may contain entries for all MBE service tables 134, one entry per MBE service table 134. A service table is a table containing data that can be used in a logic service. Each entry may contain an MBE indicator 136. An MBE indicator 136 is a field in the record entry that identifies this entry as an MBE table or not an MBE table. A service table may be a disk-based (Enscribe) or a memory-based (MBE) table. An open database server (ODBSV) may service database requests, such as read, insert, delete, modify a table record. The ODBSV may use the MBE indicator 136 to identify MBE service tables 134 from Enscribe service tables (not shown) and invoke corresponding APIs. The Enscribe service tables 134 stores data and is similar to an MBE service table 134.

When an MBE process starts, all service tables 134 configured for MBE may be loaded from a disk to a resident memory. Each time a record is updated or deleted, the disk resident copy of the record may also be updated or deleted. If MBE environment 130 is configured not to update disk images, only the memory resident database is updated. Once a service table is uploaded to memory by MBE environment 130, any changes made directly to the disk resident copy may not be uploaded to memory.

Existing ODBSV may be enhanced to support both Enscribe databases 142 and MBE databases 132. An ODBSV support library may be expanded to support MBE environment 130 in addition to Enscribe 140. A flexible service logic database library (FXDB) is a program library that provide basic functionalities that the AF 152 uses in its processing. The FXDB may be enhanced to support basic MBE database functionalities that the ODBSV uses. The enhancements include modifications to existing APIs as well as creation of new APIs specific to MBE environment 130. The APIs may be modified to take into consideration that a table may or may not be an MBE table, and to process the record accordingly.

Additionally, the FXDB may provide processing of record locks maintenance. When each record is locked, the record's file number and key information are stored in an internal database. The internal database keeps track of record locks and is internal to an AF 152. An AF 152 may use an interface to record and clear record locks (described in more detail with respect to FIG. 8). The AF 152 may clear all record locks per iteration in order to prevent deadlock situations. Each AF iteration is the portion of a transaction that spans between the receptions of two messages.

An FSLEE utility may be used for FSLEE service configuration, such as configuring service tables, providing indicators to instruct FSLEE to perform a certain function, or indicating locations of certain service tables used by FSLEE. The utility may be enhanced to allow a user to set or clear the MBE indicator 136 for each existing service table 134. Each MBE indicator 136 may be set or cleared individually. In addition, a user may set or clear MBE process name, which is defined in the MBE database configuration file 138, for each MBE service table 134. MBE environment 130 uses the MBE process name associated with each MBE service table 134 to process database requests.

Figure 3:
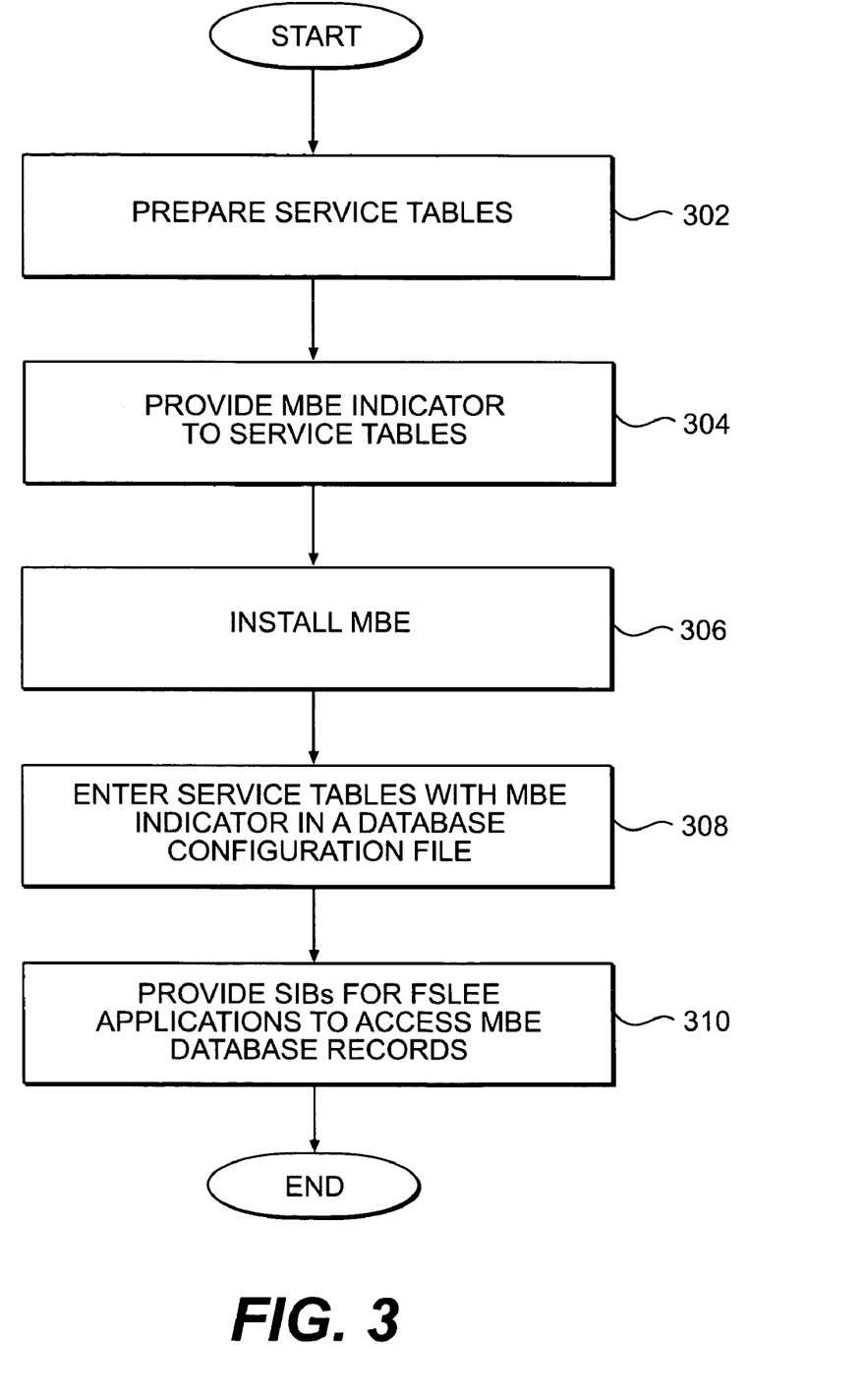
FIG. 3 is a flow chart illustrating an embodiment of an exemplary method for adapting memory-resident database in FSLEE.

FIG. 3 is a flow chart illustrating an embodiment of an exemplary method 300 for adapting memory-resident database in FSLEE. The method 300 constructs and prepares service tables 134 (block 302) by providing respective MBE indicators 136 for all desired service tables 134 in the databases, e.g., Enscribe database 142 and MBE database 132 (block 304). Service tables that do not have the MBE indicator 136 may be Enscribe tables. For new MBE service tables 134 created using graphical service design environment (GSDE), the MBE indicator 136 may be set at creation. GSDE is an application that the end user uses to develop a telephony service. For example, GSDE may provide a service designer with the option of designating a service table as MBE in a create-table dialogue box. GSDE may set the MBE indicator 136 in a create-table request that GSDE sends to the ODBSV. GSDE may display the table type (MBE or Enscribe) as returned in a read-table-characteristics request.

Next, the method 300 installs MBE environment 130 (block 306). Each service table 134 with a MBE indicator 136 may be entered in an MBE database configuration file 138 (block 308). The system and/or an FSLEE application, based on the MBE indicator 136 in the configuration file 138, recognizes the service table as an MBE table, and therefore can perform MBE functionalities. If a service table has the MBE indicator 136 but is not in the MBE database configuration file 138, the method 300 may treat the service table as an Enscribe or disk-based table.

With continued reference to FIG. 3, the method 300 then provides SIBs 156 for the FSLEE application 150 to access records in the MBE database 132 (block 310). Insert, read, update, delete, unlock, etc., are exemplary functionalities that the SIBs 156 provide. A service designer may use the SIBs 156 to insert, read, update, delete and unlock the MBE database records. Read and update operations may allow a user to lock a record during and after the read and update operations. Each record may contain a time stamp. From a SIB window, GSDE may allow a user to choose table fields specific to an MBE service table 134. The SIB window allows an GSDE user to open a SIB 156 to edit its properties.

Figure 4:
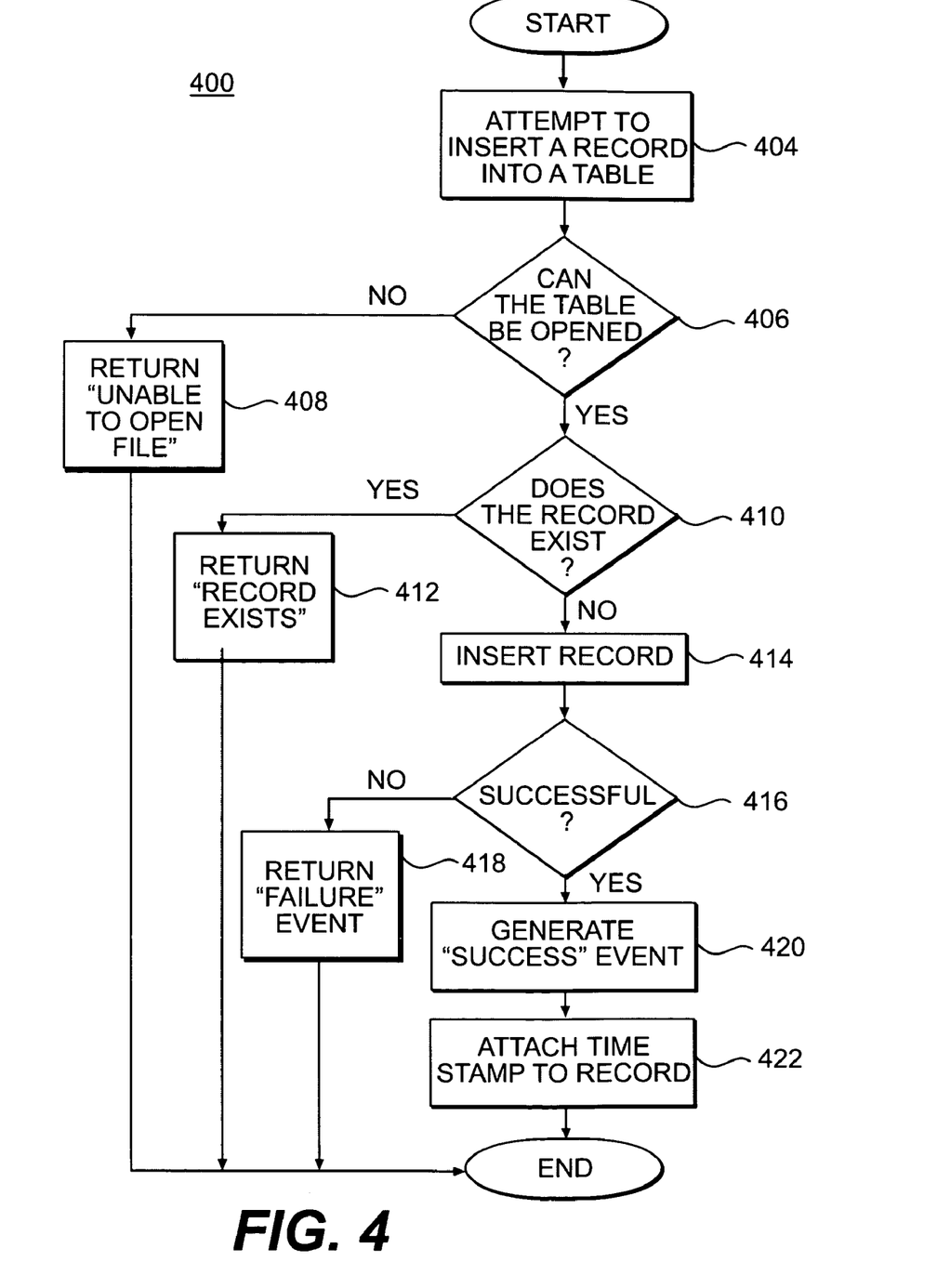
FIGS. 4–8 are flow charts illustrating exemplary service independent building block (SIB) operations that modify MBE database records in FSLEE.

FIGS. 4–8 are flow charts illustrating exemplary SIB operations that modify MBE database records in FSLEE. Referring to FIG. 4, a method 400 attempts to insert a record into an MBE service table 134 (block 404). The method 400 first determines if the MBE service table 134 can be opened (block 406). If the MBE service table 134 cannot be opened, the method 400 returns an "unable to open file" event (block 408). If the MBE service table 134 can be opened, the method 400 determines if the record to be inserted already exists (block 410). If the record already exists, the method 400 returns a "record exists" event (block 412). Otherwise, the method 400 inserts the record (block 414). If the insertion is successful (block 416), the method 400 generates a "success" event (block 420). Otherwise, the method 400 generates a "failure" event (block 418). Optionally, the method 400 attaches a time stamp to record (block 422). The time stamp may be used in an update record process and a delete record process.

Figure 5:
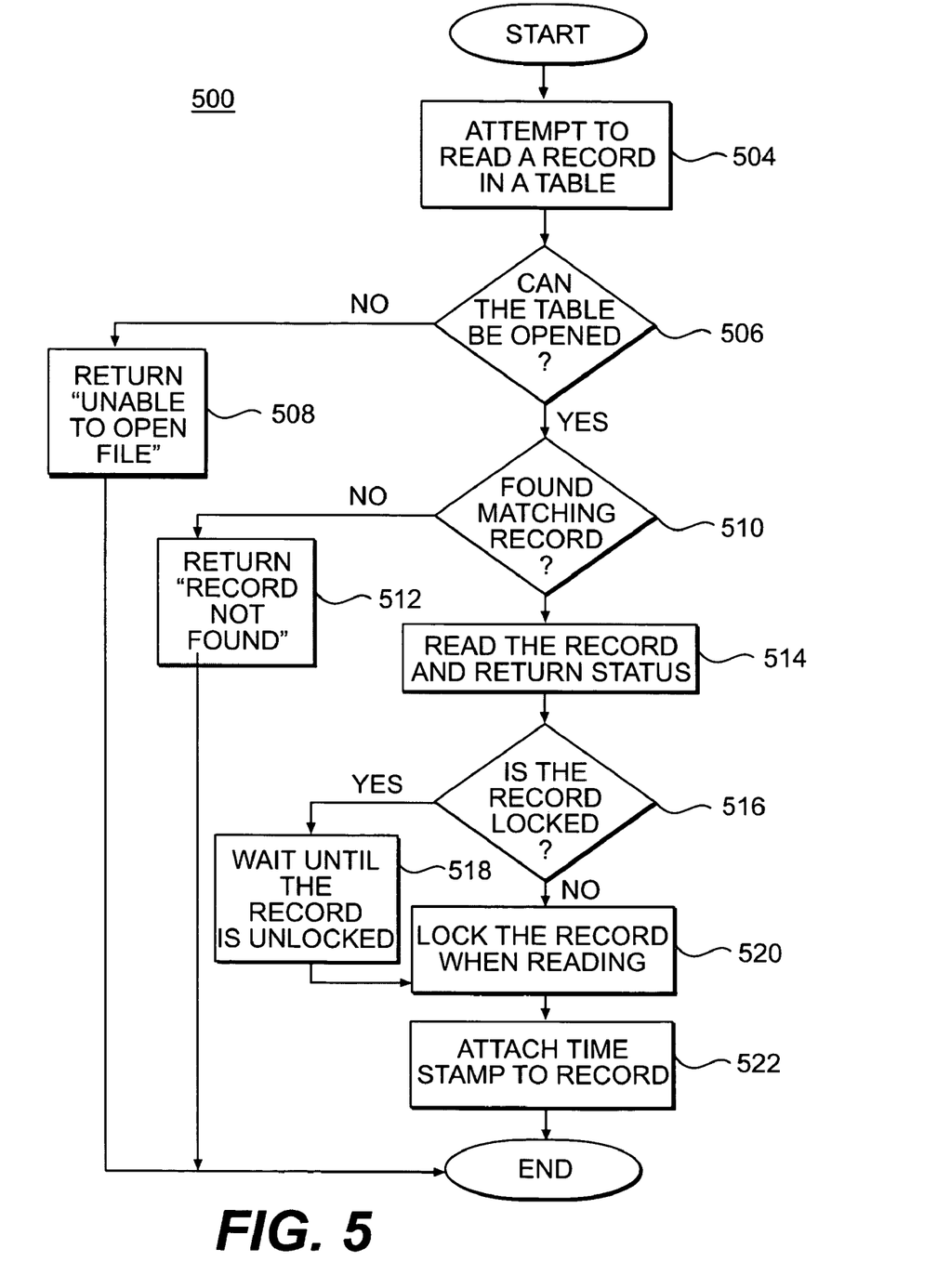

Referring to FIG. 5, a method 500 attempts to read a record in an MBE service table 134 (block 504). The method 500 first determines if the MBE service table 134 can be opened (block 506). If the MBE service table 134 cannot be opened, the method 500 returns an "unable to open file" event (block 508). If the MBE service table 134 can be opened, the method 500 locates the matching record (block 510). If the record cannot be located, the method 500 returns a "record not found" event (block 512). Otherwise, the method 500 reads the record and returns status, i.e., a "success" event if the read operation is successful and a "failure" event if the read operation is not successful (block 514). The method 500 determines if the record is locked by another process (block 516). If the record is locked, the method 500 waits until the record is unlocked (block 518), and locks the record while reading the record (block 520). The read operation may return a record time stamp to be used later by an update or delete operation (block 522).

Figure 6:
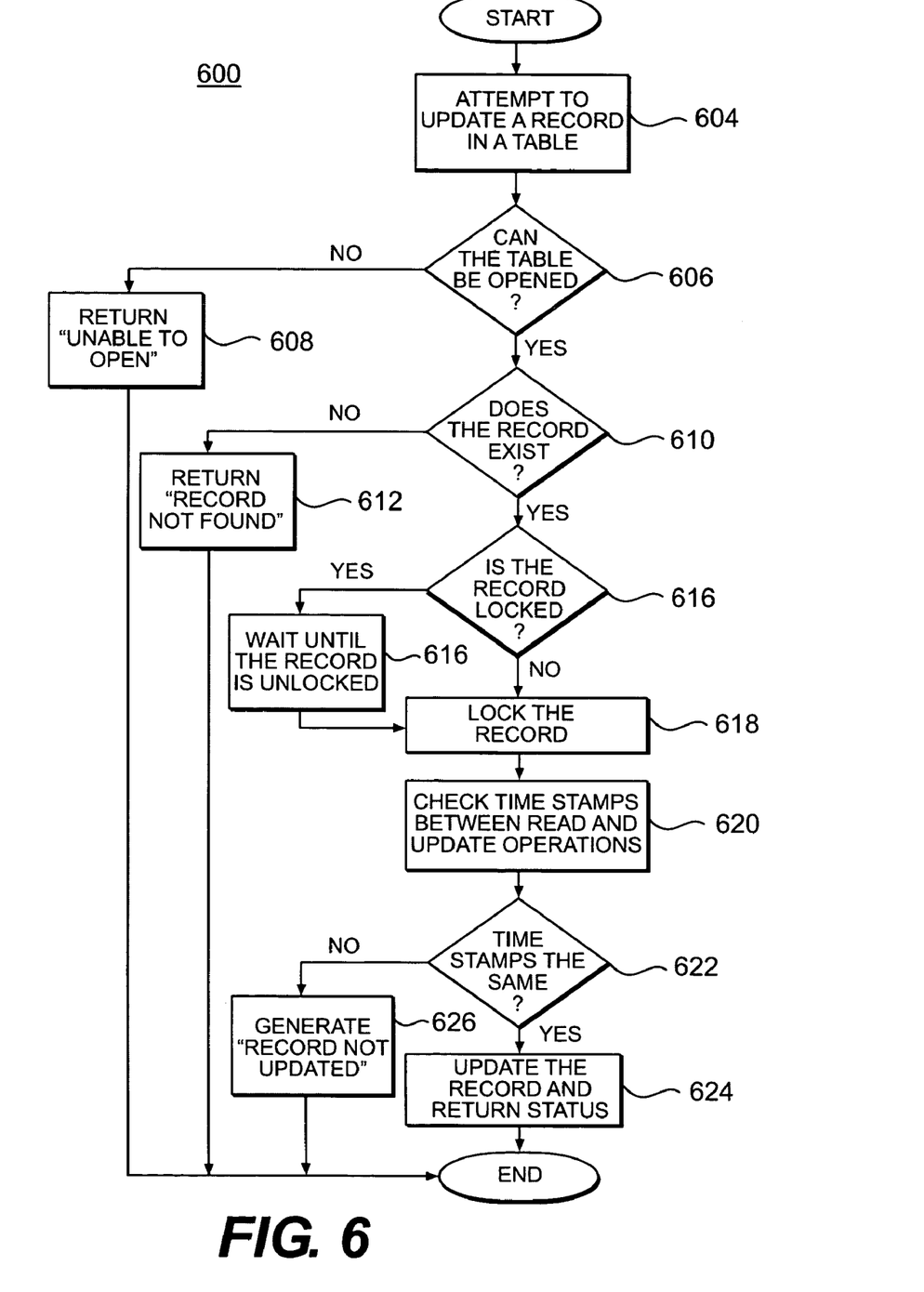

Referring to FIG. 6, a method 600 attempts to update a record in an MBE service table 134 (block 604). The method 600 first determines if the MBE service table 134 can be opened (block 606). If the MBE service table 134 cannot be opened, the method 600 returns an "unable to open file" event (block 608). If the MBE service table 134 can be opened, the method 600 determines if the specified record exists (block 610). If the record does not exist, the method 600 returns a "record not found" event (block 612). Otherwise, the method 600 determines if the record is locked by another process (block 614). If the record is locked, the method 600 waits until the record is unlocked (block 616), and optionally locks the record (block 618). Next, in order to prevent simultaneous updates by multiple processes, the method 600 checks the time stamps between the read and update operations (block 620). If the time stamps match (block 622), the method 600 updates the record with new data and generates the proper event (success or failure) (block 624). Mismatching time stamps indicate that another process has updated the record between the read and update operations. In this case, the method 600 aborts the update operation and generates a "record not updated" event (block 626). If no time stamp is provided, the method 600 ignores any time stamp differences.

Figure 7:
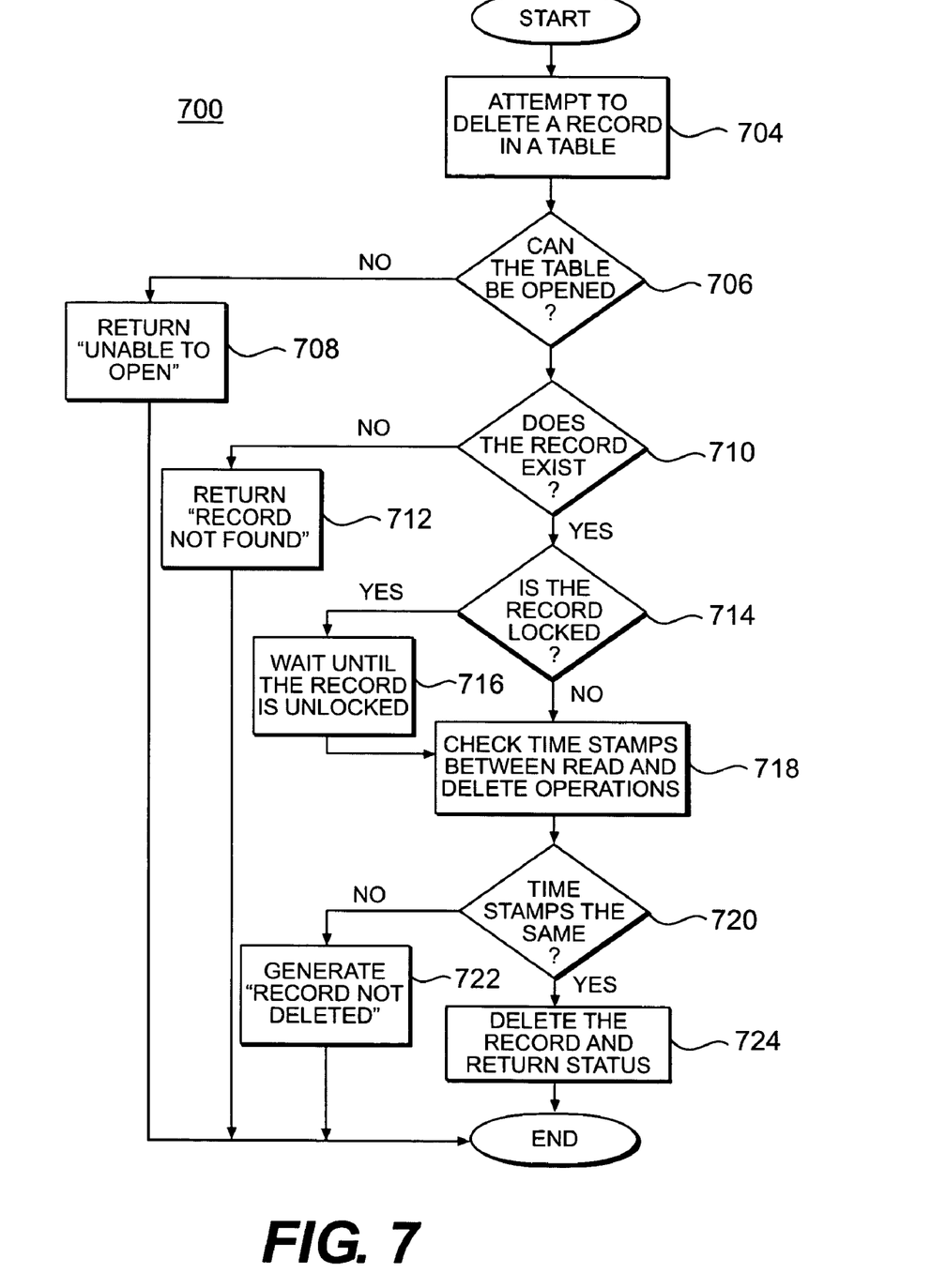

Referring to FIG. 7, a method 700 attempts to delete a record in an MBE service table 134 (block 704). The method 700 first determines if the MBE service table 134 can be opened (block 706). If the MBE service table 134 cannot be opened, the method 700 returns an "unable to open file" event (block 708). If the MBE service table 134 can be opened, the method 700 determines if the specified record exists (block 710). If the record does not exist, the method 700 returns a "record not found" event (block 712). If the record exists, the method 700 determines if the record is locked by another process (block 714). If the record is locked, the method 700 waits until the record is unlocked (block 716). Next, in order to prevent simultaneous updates by multiple processes, the method 700 checks the time stamps between the read and delete operations (block 718). If the time stamps match (block 720), the method 700 deletes the record by performing a NULL write operation and generates the proper event (success or failure) (block 7224). Mismatching time stamps indicate that another process has updated the record between the read and delete operations. In this case, the method 700 aborts the delete operation and generates a "record not deleted" event, which is a deletion failure (block 722). If no time stamp is provided, the method 700 ignores any time stamp differences.

Figure 8:
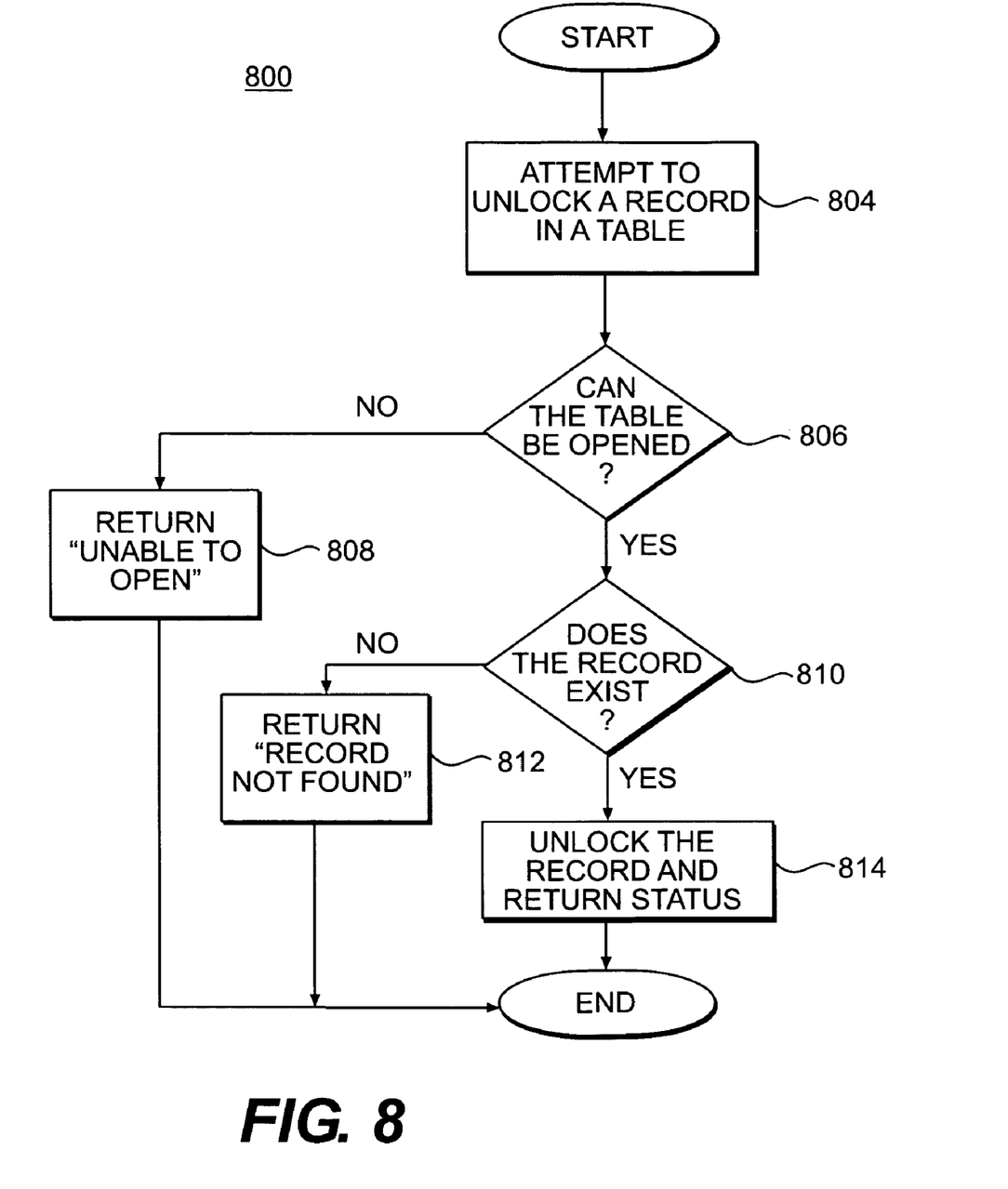

Referring to FIG. 8, a method 800 attempts to unlock a record currently locked by the process in an MBE service table 134 (block 804). The method 800 first determines if the MBE service table 134 can be opened (block 806). If the MBE service table 134 cannot be opened, the method 800 returns an "unable to open file" event (block 808). If the MBE service table 134 can be opened, the method 800 determines if the record exists (block 810). If the record does not exist, the method 800 returns a "record not found" event (block 812). If the record exists, the method 800 unlocks the record and returns a "success" or "failure" status (block 814).

A deadlock condition can occur if a process locks a record and fails to unlock it. MBE does not maintain a lock count on a record. Therefore, a process cannot lock a record more than once. If a process requests multiple locks, only the first one is granted (assuming another process has not already locked the record). Consequently, if the process requests multiple unlocks, only the first request is granted.

Figure 9:
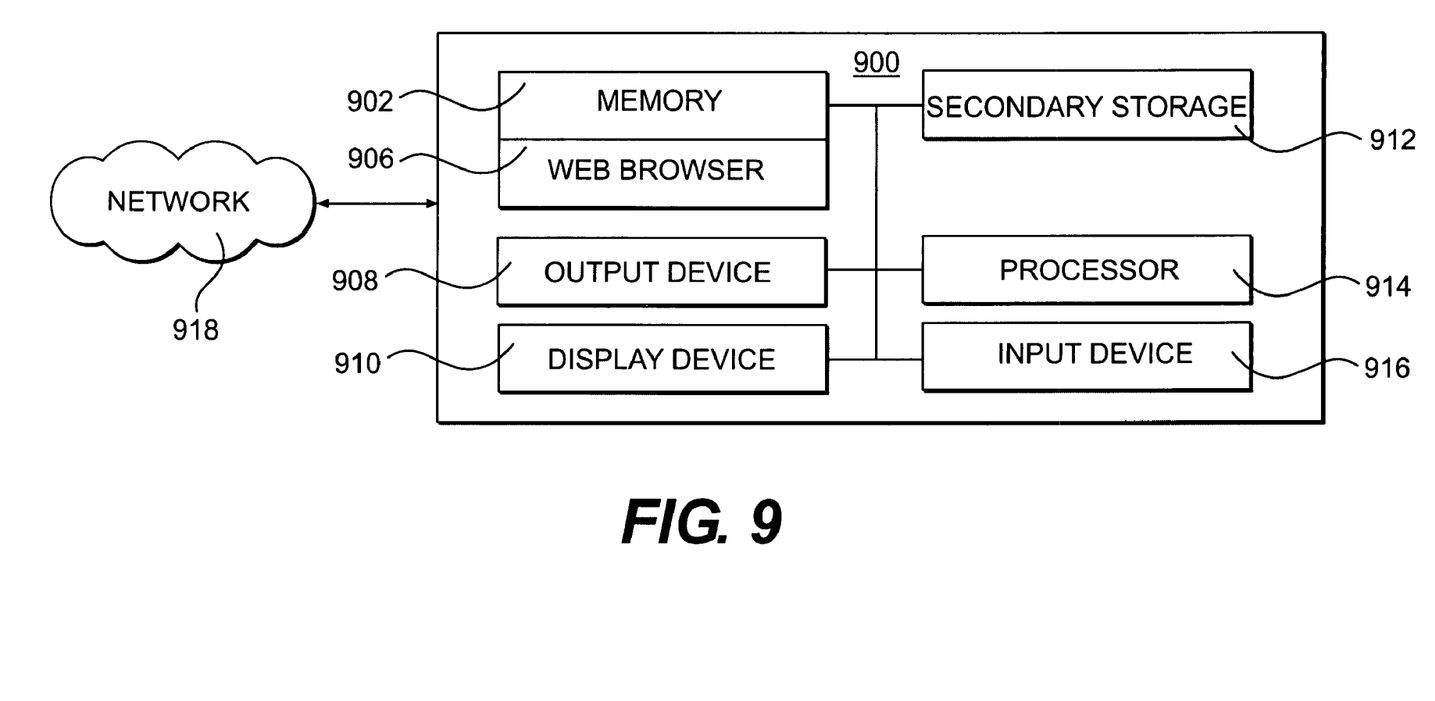
FIG. 9 illustrates an embodiment of hardware components of a computer that may be used in connection with an exemplary method for adapting memory-resident database in FSLEE.

FIG. 9 illustrates exemplary hardware components of an embodiment of a computer 900 that may be used to in connection with the exemplary method for adapting memory-resident database in FSLEE. The computer 900 includes a connection with a network 918, such as the Internet or other type of computer or telephone networks. The network enables the computers 900 to send and receive files and other information. The computer 900 typically includes a memory 902, a secondary storage device 912, a processor 914, an input device 916, a display device 910, and an output device 908.

The memory 902 may include random access memory (RAM) or similar types of memory. The memory 902 may be connected to the network 918 by a web browser 906. The web browser 906 makes a connection by way of the world wide web (WWW) to other computers, and receives information from the other computers that is displayed on the computer 900. The secondary storage device 912 may include a hard disk drive, floppy disk drive, CD-ROM drive, or other types of non-volatile data storage, and it may correspond with various databases or other resources. The processor 914 may execute applications or other information stored in the memory 902, the secondary storage 912, or received from the Internet or other network 918. For example, the processor 914 may execute a software application 907 used in connection with an exemplary method for adapting memory-resident database in FSLEE. The input device 916 may include any device for entering data into the computer 900, such as a keyboard, key pad, cursor-control device, touch-screen (possibly with a stylus), or microphone. The display device 910 may include any type of device for presenting visual image, such as, for example, a computer monitor, flat-screen display, television screen, or display panel. The output device 908 may include any type of device for presenting data in hard copy format, such as a printer, and other types of output devices including speakers or any device for providing data in audio form. The computer 900 can possibly include multiple input devices, output devices, and display devices.

Although the computer 900 is depicted with various components, one skilled in the art will appreciate that this computer can contain additional or different components. In addition, although aspects of an implementation consistent with the method for adapting memory-resident database in FSLEE are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet or other network; or other forms of RAM or ROM. The computer-readable media may include instructions for controlling the computer 900 to perform a particular method.

While the system and method for adapting memory-resident database in FSLEE have been described in connection with an exemplary embodiment, those skilled in the art will understand that many modifications in light of these teachings are possible, and this application is intended to cover variations thereof.

What is claimed is:

1. A method for adapting memory-resident database in a flexible service logic execution environment (FSLEE), comprising the steps of:
   constructing a service table in an FSLEE application that executes a logic service, wherein the service table contains data that can be used in the logic service, and wherein the FSLEE application comprises:
   an application framework capable of managing functionalities of the FSLEE application;
   a service independent building block (SIB) library that contains a set of SIBs; and
   an FSLEE configuration that renders each FSLEE application unique,
   wherein the application framework invokes a service image to execute the SIBs and perform logics of the logic service, and the service image is a visual representation of the logic service that defines the logics for the logic service;
   providing a memory based database environment (MBE) indicator to the service table, wherein the MBE indicator is a field in a record entry that differentiates an MBE service table from another service table;
   setting the MBE indicator of the service table in the database configuration file; and
   providing the SIBs to access the MBE table constructed in the FSLEE application.

2. The method of claim 1, further comprising attaching a time stamp to the MBE database records after each access to prevent simultaneous modifications by multiple processes, wherein mismatching time stamps on a record indicates that another process has modified the record.

3. The method of claim 1, further comprising inserting a record into the service table.

4. The method of claim 3, further comprising:
   returning a status indicator; and
   attaching a time stamp to the inserted record.

5. The method of claim 1, further comprising reading a record in the service table.

6. The method of claim 5, further comprising:
   locking the record before the reading step; and
   returning a status indicator.

7. The method of claim 1, further comprising updating a record in the service table.

8. The method of claim 7, further comprising:
   reading and locking the record before the updating step;
   checking time stamps between the reading step and the updating step; and
   returning a status indicator.

9. The method of claim 1, further comprising deleting a record in the service table.

10. The method of claim 9, further comprising:
    reading the record before the deleting step;
    checking time stamps between the reading step and the deleting step; and
    returning a status indicator.

11. The method of claim 1, further comprising unlocking a record in the service table.

12. The method of claim 11, wherein the unlocking step includes using the application framework to unlock the record.

13. An apparatus for adapting memory-resident database in a flexible service logic execution environment (FSLEE), comprising:
    a memory based database environment (MBE) database, comprising a database configuration file providing an MBE indicator to a service table to differentiate an MBE service table from another service table, wherein the MBE service table is constructed in an FSLEE application and contains data that can be used in a logic service; and
    an FSLEE application that executes the logic service, comprising a service independent building block (SIB) library containing a set of SIBs that access the MBE service table constructed in the FSLEE application, an application framework capable of managing functionalities of the FSLEE application, and an FSLEE configuration that renders each FSLEE application unique, wherein the application framework invokes a service image to execute the SIBs and perform logics of the logic service, and the service image is a visual representation of the logic service that defines the logics for the logic service.

14. The apparatus of claim 13, wherein the application framework clears record locks in the FSLEE application.

15. The apparatus of claim 13, wherein the SIBs inserts a record in the service table.

16. The apparatus of claim 13, wherein the SIBs reads a record in the service table.

17. The apparatus of claim 13, wherein the SIBs updates a record in the service table.

18. The apparatus of claim 13, wherein the SIBs deletes a record in the service table.

19. A computer readable storage medium providing instruction for adapting memory-resident database in a flexible service logic execution environment (FSLEE), the instructions comprising: constructing a service table in an FSLEE application that executes a logic service, wherein the service table contains data that can be used in the logic service, and wherein the FSLEE application comprises: an application framework capable of managing functionalities of the FSLEE application; a service independent building block (SIB) library that contains a set of SIBs; and an FSLEE configuration that renders each FSLEE application unique, wherein the application framework invokes a service image to execute the SIBs and perform logics of the logic service, and the service image is a visual representation of the logic service that defines the logics for the logic service; providing a memory based database environment (MBE) indicator to the service table, wherein the MBE indicator is a field in a record entry that differentiates an MBE service table from another service table; setting the MBE indicator of the service table in the database configuration file; and providing the SIBs to access the MBE table constructed in the FSLEE application.

20. The computer readable storage medium of claim 19, further comprising instructions for attaching a time stamp to the MBE database records after each access to prevent simultaneous modifications by multiple processes, wherein mismatching time stamps on a record indicates that another process has modified the record.

21. The method of claim 1, wherein the database configuration file contains entries for all service tables, and wherein each entry contains an MBE indicator.

22. The method of claim 1, further comprising granting only a first request for locking a record when multiple lock requests are submitted.

23. The method of claim 1, further comprising enabling a user to choose table fields specific to a service table, including enabling the user to open a SIB to edit its properties.

* * * * *